United States Patent
Erdmann et al.

(10) Patent No.: US 8,596,311 B2
(45) Date of Patent: Dec. 3, 2013

(54) VALVE ASSEMBLY FOR A FUEL RECIRCULATION LINE

(75) Inventors: Matthew L. Erdmann, Ypsilanti, MI (US); Matthew D. Reuther, Oxford, MI (US)

(73) Assignee: Eaton Corporation, Cleveland, OH (US)

( * ) Notice: Subject to any disclaimer, the term of this patent is extended or adjusted under 35 U.S.C. 154(b) by 701 days.

(21) Appl. No.: 12/624,699

(22) Filed: Nov. 24, 2009

(65) Prior Publication Data

US 2011/0120591 A1 May 26, 2011

(51) Int. Cl.
*B65B 31/00* (2006.01)
*B60K 15/035* (2006.01)

(52) U.S. Cl.
CPC ............................. *B60K 15/03519* (2013.01)
USPC .............................. 141/59; 220/86.2; 123/518

(58) Field of Classification Search
USPC .............................. 141/59, 70; 220/562, 86.2
See application file for complete search history.

(56) References Cited

U.S. PATENT DOCUMENTS

| | | | | |
|---|---|---|---|---|
| 3,447,689 A | * | 6/1969 | Solymar | 210/356 |
| 5,181,497 A | * | 1/1993 | Matsushita et al. | 123/520 |
| 5,431,144 A | * | 7/1995 | Hyodo et al. | 123/520 |
| 6,029,719 A | * | 2/2000 | Hor et al. | 141/348 |
| 6,783,022 B2 | * | 8/2004 | Essing | 220/562 |
| 6,895,943 B1 | | 5/2005 | Taxon | |
| 2005/0098160 A1 | | 5/2005 | Taxon | |
| 2009/0250119 A1 | | 10/2009 | Whelan | |

FOREIGN PATENT DOCUMENTS

| | | |
|---|---|---|
| DE | 19632690 A1 | 2/1998 |
| EP | 1149722 A2 | 10/2001 |
| WO | 2011048468 A1 | 4/2011 |

* cited by examiner

*Primary Examiner* — Timothy L Maust
*Assistant Examiner* — Robert Bell, III
(74) *Attorney, Agent, or Firm* — Quinn Law Group, PLLC

(57) ABSTRACT

A fuel system includes a fuel tank, a fill head, a vapor canister, and a valve assembly. The fill head is in fluid communication with the fuel tank. Fluid flows from the fill head to the fuel tank. The vapor canister is configured for absorbing vapor therein. A recirculation line is configured to fluidly extend between the fuel tank and the fill head. A vapor line is configured to fluidly extend between the fuel tank and the vapor canister. The valve assembly is operatively disposed along the vapor line or the recirculation line. The valve assembly includes a filter having a membrane formed from a microporous element that is fluid impermeable and vapor permeable. Fluid is prevented from flowing through the membrane and into the vapor canister while allowing vapor to flow through the membrane and into the vapor canister.

28 Claims, 4 Drawing Sheets

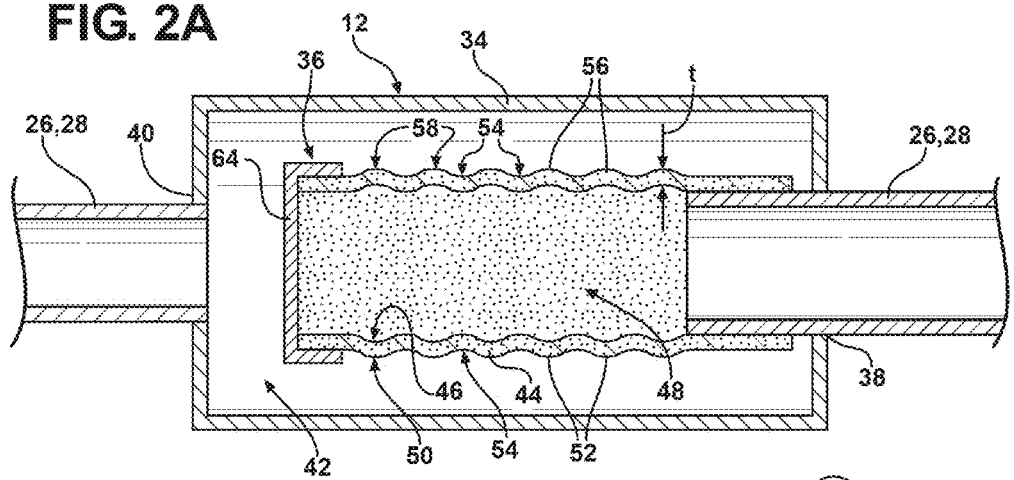
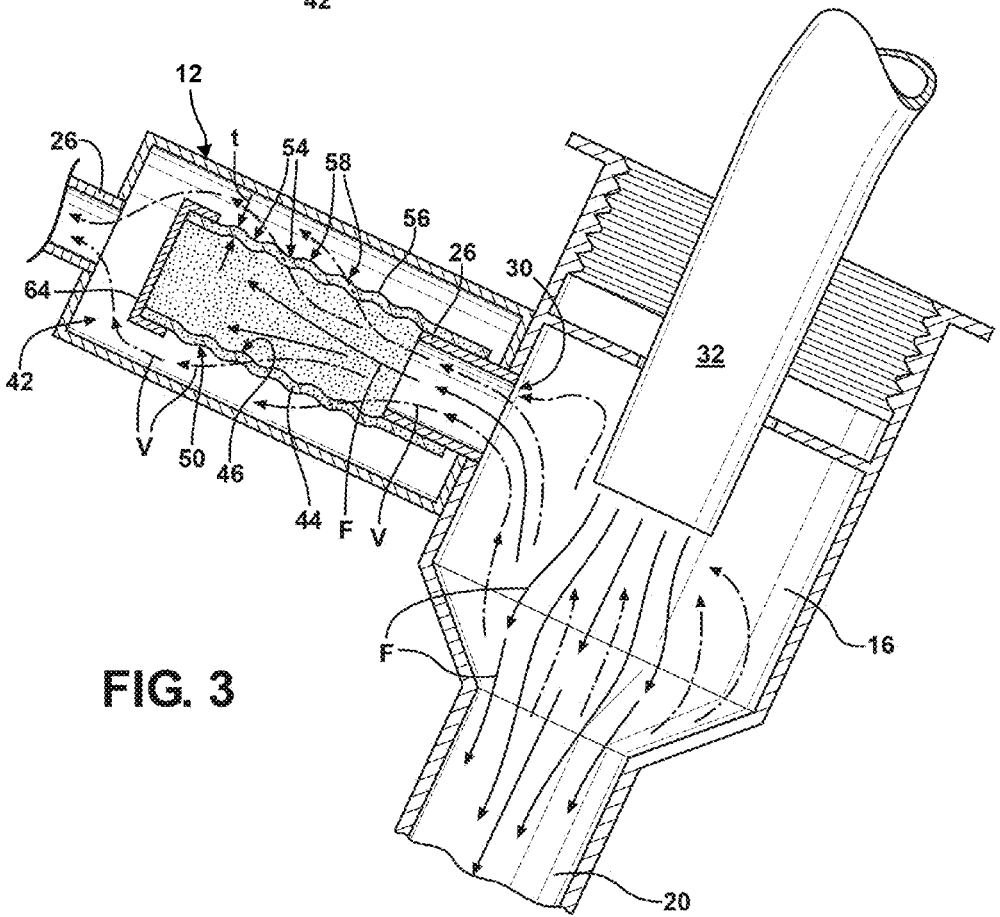

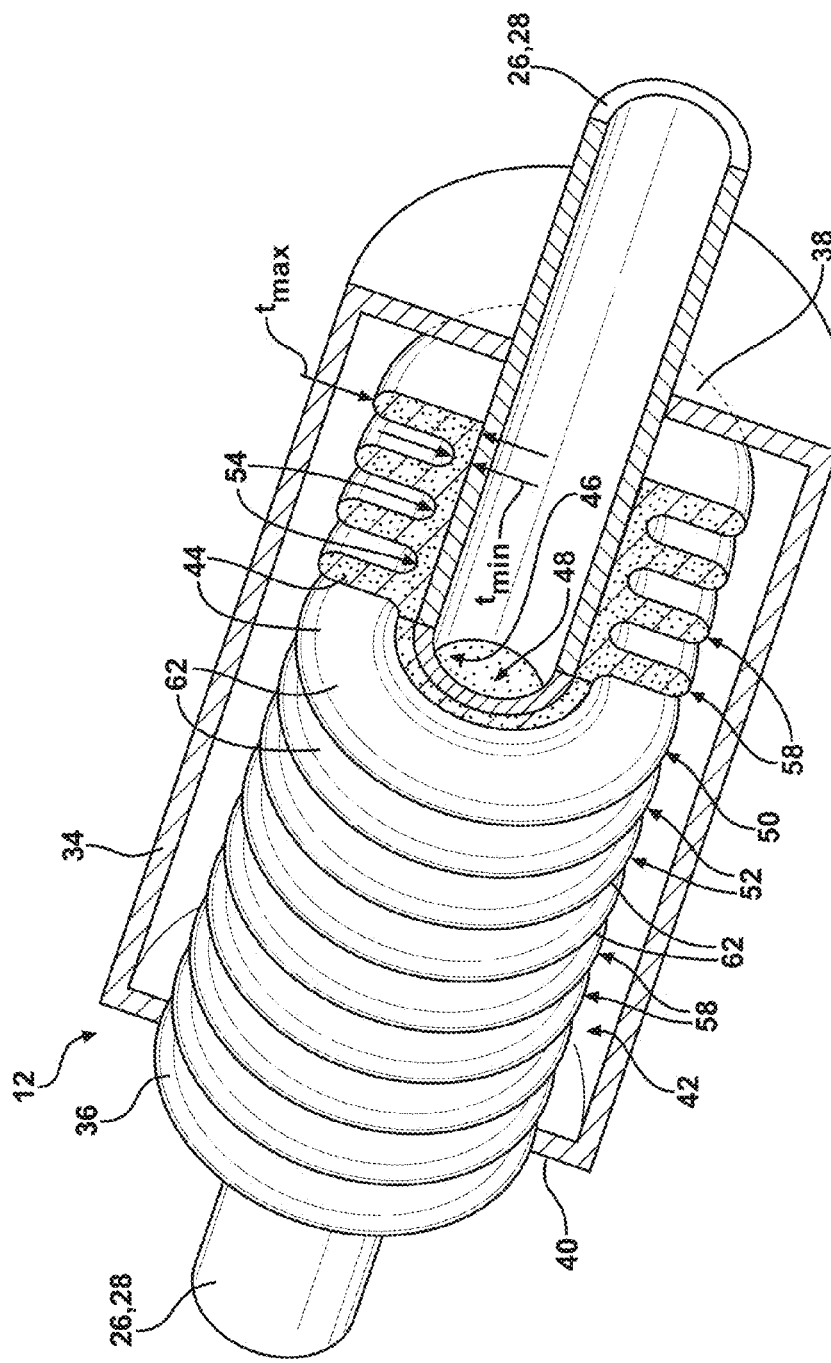

US 8,596,311 B2

VALVE ASSEMBLY FOR A FUEL RECIRCULATION LINE

TECHNICAL FIELD

The invention relates to a valve assembly for a fuel recirculation line.

BACKGROUND OF THE INVENTION

Fuel systems include a vapor canister that is configured for capturing vapor that is emitted through the fuel system. If fluid enters the vapor canister, the vapor canister will not function properly and replacement is typically required. To prevent fluid from entering the vapor canister, a mechanical valve assembly is provided in the system. The mechanical valve assembly includes a moving valve portion that moves to open under pressure in the fuel system to allow vapor to escape while preventing fluid from flowing into the canister.

SUMMARY OF THE INVENTION

A fuel system is configured for filling a fuel tank with a volume of fluid. The fuel system includes a fill head, a fuel tank, a vapor canister, and a valve assembly. The fill head is configured to be in fluid communication with the fuel tank. The fill head is configured such that fluid flows from the fill head to the fuel tank. The vapor canister is configured for absorbing vapor therein. A recirculation line is configured to fluidly extend between the fuel tank and the fill head. A vapor line fluidly is configured to fluidly extend between the fuel tank and the vapor canister. The valve assembly is operatively disposed along the vapor line or the recirculation line. The valve assembly includes a filter having a membrane that is fluid impermeable and vapor permeable such that fluid is prevented from flowing through the membrane and into the vapor canister while vapor is allowed to flow through the membrane and into the vapor canister.

In another embodiment, a fuel system includes a fuel tank, a fill head, a vapor canister, and a valve assembly. The fuel tank is configured for receiving a volume of fluid. The fill head is in fluid communication with the fuel tank. The fill head is configured such that fluid flows from the fill head to the fuel tank. The vapor canister is configured for absorbing vapor therein. A recirculation line fluidly extends between the fuel tank and the vapor canister. A vapor line fluidly extends between the fuel tank and the fill head. A valve assembly is operatively disposed along the vapor line or the recirculation line. The valve assembly includes a housing and a filter. The housing has an inlet side and an outlet side and defines a vapor passage therein. The filter is operatively disposed within the vapor passage and is attached to the inlet side of the housing. The filter includes a membrane having an interior wall surrounding a fluid chamber and an exterior wall opposing the fluid chamber. The filter is configured such that fluid and vapor are allowed to enter the fluid chamber from the inlet side. The membrane is configured to allow the passage of vapor and prevent the passage of liquid from the fluid chamber therethrough to the vapor passage. The interior wall is generally cylindrical. The exterior wall may include a plurality of undulations that each extend to a peak, and a groove is defined between each of the undulations.

In another embodiment, a fuel system includes a fuel tank, a fill head, a vapor canister, and a valve assembly. The fuel tank is configured for receiving a volume of fluid. The fill head is in fluid communication with the fuel tank. The fill head is configured such that fluid flows from the fill head to the fuel tank. The vapor canister is configured for absorbing vapor therein. A recirculation line fluidly connects the fuel tank and the fill head. A vapor line fluidly connects the fuel tank and the vapor canister. The valve assembly is operatively disposed along the vapor line or the recirculation line. The valve assembly includes a filter having a membrane that is fluid impermeable and vapor permeable. Accordingly, fluid is prevented from flowing through the membrane and into the vapor canister while vapor is allowed to flow through the membrane and into the vapor canister.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A is schematic cross-sectional side view of a valve assembly of FIGS. 1A-1C;

FIG. 2B is a schematic partial cross-sectional perspective view of another embodiment of the valve assembly of FIGS. 1A-1C;

FIG. 3 is a schematic cross-sectional side view of a fill head of fuel system illustrating the valve assembly of FIG. 2A in fluid communication therewith.

DESCRIPTION OF THE PREFERRED EMBODIMENTS

Figure 1A:
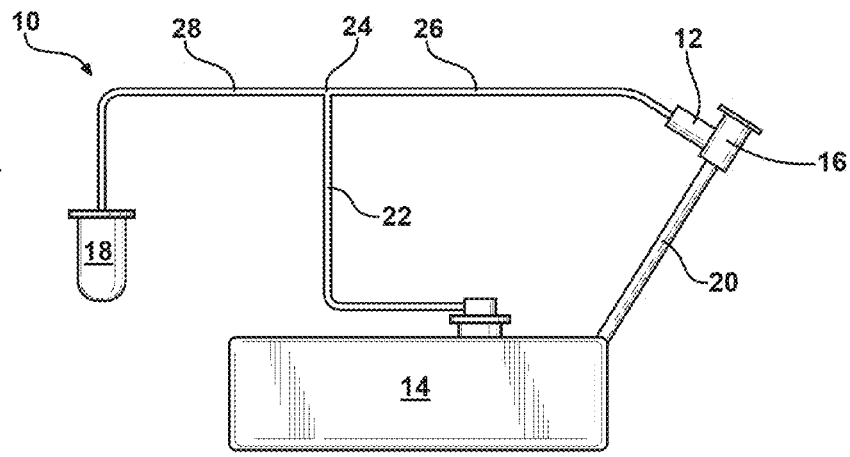
FIGS. 1A-1C are schematic views of different embodiments of a fuel system having a valve assembly located at various locations therein.
Figure 1B:
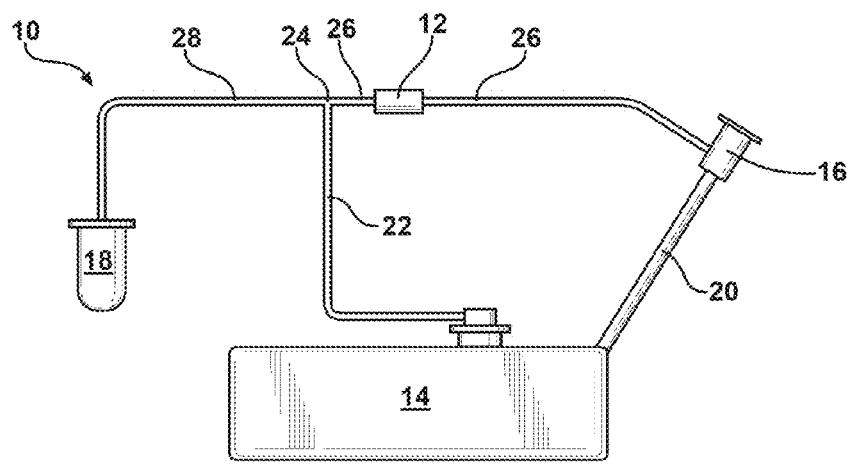
Figure 1C:
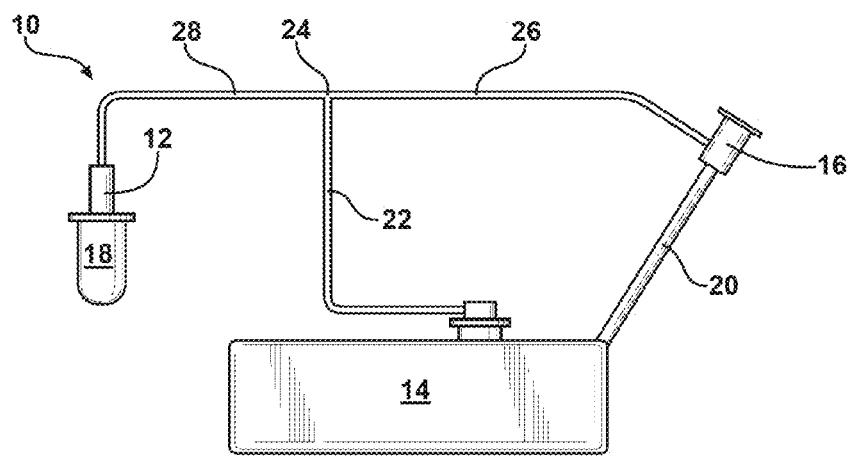

Referring to the drawings, wherein like reference numbers refer to like components, FIGS. 1A-1C show a fuel system 10 having a valve assembly 12 disposed in various locations therein. More specifically, the fuel system 10 includes a fuel tank 14, a fill head 16, a vapor canister 18, and the valve assembly 12. A fill pipe 20 fluidly interconnects the fill head 16 and the fuel tank 14 such that fluid flows from the fill head 16 into the fuel tank 14. A vent tube 22 fluidly extends from the fuel tank 14 to a junction 24. A recirculation line 26 fluidly extends between the fuel tank 14 and the fill head 16. More specifically, the recirculation line 26 may fluidly extend between the vent tube 22, at the junction 24, and the fill head 16. A vapor line 28 fluidly extends between the fuel tank 14 and the vapor canister 18. More specifically, the vapor line 28 may fluidly extend between the vent tube 22, at the junction 24, and the vapor canister 18. The fuel system 10 is part of an Onboard Refueling Vapor Recovery (ORVR) system. The ORVR system is a vehicle emission control system that captures fuel vapors V from the fuel tank 14 and/or the recirculation lines 26 during refueling. The fuel tank 14 and fill head 16 are configured such that when refueling the vehicle (not shown), fuel vapors V in the fuel tank 14 travel through the vent tube 22 and the vapor line 28 and into the vapor canister 18, which absorbs the vapor V. When an engine (not shown) of the vehicle is in operation, the engine draws the fuel vapors V into an engine intake manifold (not shown) to be used as fuel for the engine. The vapor canister 18 may be an activated carbon packed canister or any other vapor canister 18 known to those skilled in the art. To provide pressure equalization within the fuel system 10 during refueling, air and/or vapor V exits the fuel tank 14 and travels through the vent tube 22 through both the vapor line 28 into the vapor canister 18 and the recirculation line 26 into the fill head 16.

The fuel tank 14 is configured for receiving a volume of fluid F. The fill neck is configured such that fluid F flows from the fill head 16, through the fill pipe 20, and to the fuel tank 14. Additionally, a vent 30 is defined in the fill head 16 that opens to the recirculation line 26. The valve assembly 12 is operatively disposed between the fill head 16 and the vapor canister 18 to prevent fluid F from entering the vapor canister 18, while allowing vapor V to flow into the vapor canister 18. In the embodiment shown in FIG. 1A, the valve assembly 12 is disposed along the recirculation line 26 near the fill head 16. In the embodiment shown in FIG. 1B, the valve assembly 12 is disposed along the recirculation line 26 such that the valve assembly 12 is spaced from the fill head 16 and the junction 24. In the embodiment shown in FIG. 1C, the valve assembly 12 is disposed along the vapor lines 28 near the vapor canister 18. It should be appreciated that the valve assembly 12 is not limited to the locations shown in FIGS. 1A-1C, but may be disposed at any other location along the recirculation line 26 and the vapor line 28, as known to those skilled in the art, such that fluid F is prevented from entering the vapor canister 18.

During fueling, as shown in FIG. 3, a fuel nozzle 32 is inserted into the fill head 16, and fuel flows into the fuel tank 14. As the fuel flows into the fuel tank 14, some of the vapor V within the fuel tank 14 is displaced and enters the fill head 16. Once the vapor V enters the fill head 16, the vapor V becomes entrained by a high flow of the fluid F that is exiting the nozzle. However, the vapor V and a portion of the fluid F may overflow into the recirculation lines 26 via the vent 30 in the fill head 16. The vapor canister 18 may be negatively affected if liquid from the recirculation lines 26 were to enter. Additionally, if fluid F were allowed to enter the recirculation lines 26 past the valve assembly 12, the liquid may become an obstruction to venting the fluid vapors V to the vapor canister 18 or the liquid may interfere with vapor V flow through the recirculation line 26, causing poor fill quality and poor ORVR system performance.

Referring to FIGS. 2A-2C and 3, the valve assembly 12 includes a housing 34 and a filter 36. The housing 34 includes an inlet side 38 and an outlet side 40. The housing 34 defines a vapor passage 42 operatively extending between the inlet side 38 and the outlet side 40. The filter 36 is operatively attached to the inlet side 38 such that the filter 36 is operatively disposed within the vapor passage 42 of the housing 34. The filter 36 includes a membrane 44 that has an interior wall 46 surrounding a fluid chamber 48 and an exterior wall 50 opposing the fluid chamber 48. The filter 36 is configured such that fluid F and vapor V are allowed to enter the fluid chamber 48 from the inlet side 38 of the housing 34. The membrane 44 is formed from a micro-porous element such that the membrane 44 is liquid-discriminating and prevents fluid F from flowing through it. More specifically, the membrane 44 is configured to allow the passage of vapor V and prevent the passage of fluid F therethrough. As a result, only the vapor V is allowed to pass from the inlet side 38 to the outlet side 40 via the filter 36. Additionally, the membrane 44 is configured such that the valve assembly 12 operates without any moving parts therein. If fluid F were allowed to get past the membrane 44 and further enter the recirculation line 26, it may cause adverse effects on system performance ranging from fluid F fill issues to permanent damage to the carbon canister, making the vehicle unable to meet emission requirements.

Referring to FIGS. 2A-2C and 3, the filter 36 has a generally cylindrically shaped profile. Referring specifically to the embodiment shown in FIGS. 2A and 3, the interior wall 46 and the exterior wall 50 have a generally uniform thickness t and a plurality of undulations 52. A groove 54 is defined between each of the undulations 52. The undulations 52 form a plurality of rings 56 that radially surround the fluid chamber 48 in spaced and generally parallel relationship to one another. Each ring 56 extends to a peak 58, and the grooves 54 are defined between adjacent rings 56. The peaks 58 and grooves 54 may be complimentary to one another such that the interior and the exterior wall 46, 50 provide a profile that is generally sinusoidal. However, other profiles may be used, as known to those skilled in the art.

Figure 2C:
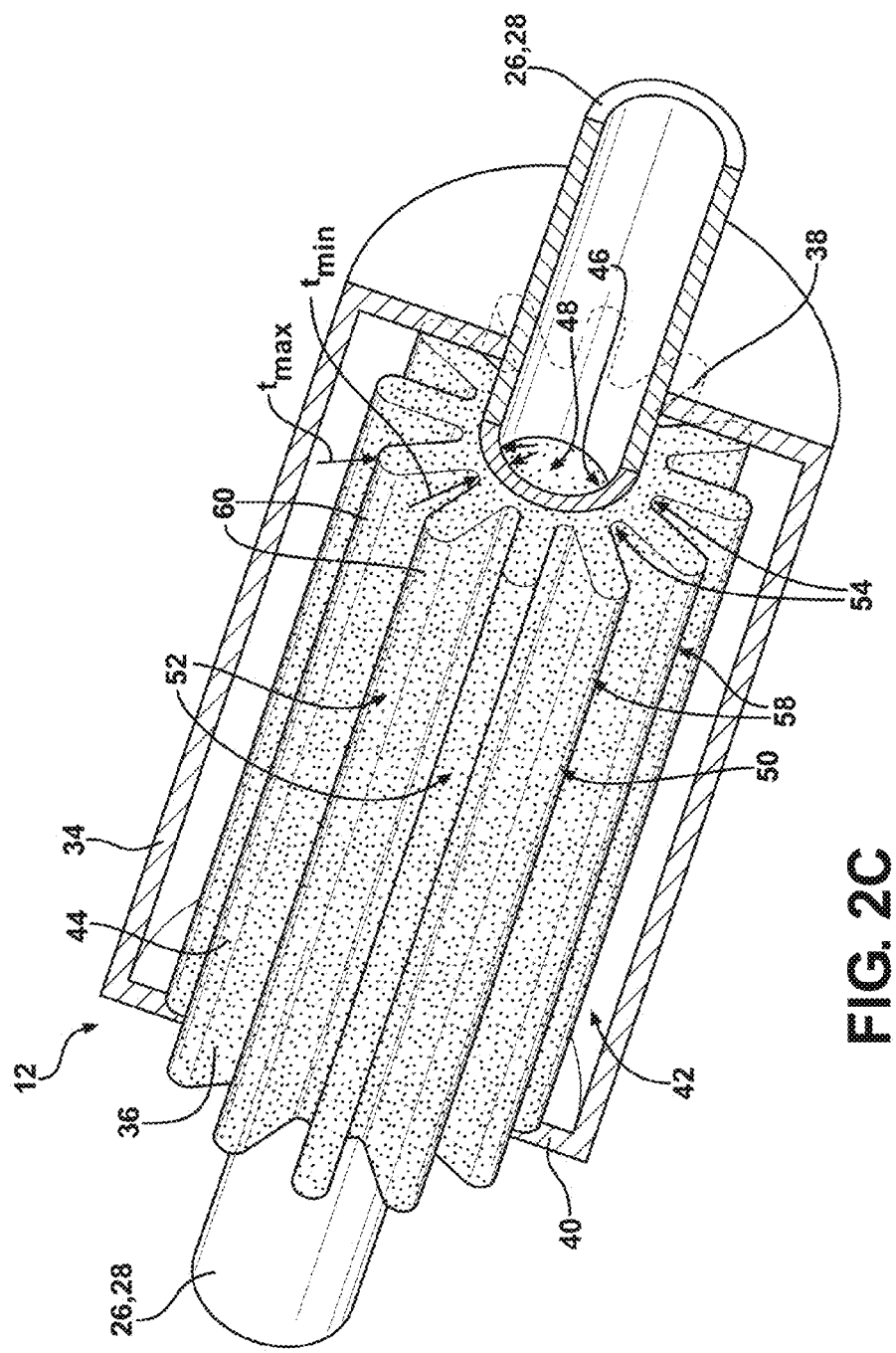
FIG. 2C is a schematic partial cross-sectional perspective view of yet another embodiment of the valve assembly of FIGS. 1A-1C.

Referring to the embodiment shown in FIGS. 2B and 2C, the interior wall 46 is generally cylindrical and the exterior wall 50 includes a plurality of undulations 52. A groove 54 is defined between each of the undulations 52. Referring specifically to the embodiment shown in FIG. 2B, the undulations 52 include a plurality of discs 62 that radially surround the interior wall 46 in spaced and generally parallel relationship to one another. In this embodiment, each ring 56 extends to a peak 58 and each groove 54 is defined between adjacent discs 62, such that each groove 54 radially surrounds the membrane 44.

Referring specifically to the embodiment of the filter 36 of the valve assembly 12 shown in FIG. 2C, the undulations 52 include a plurality ridges 60 that extend linearly along the exterior wall 50 in radially spaced relationship to one another. Each ridge 60 extends radially to a peak 58 and one of the grooves 54 are defined between the adjacent ridges 60. In this embodiment, each peak 58 is generally U-shaped and each groove 54 is generally V-shaped. The V-shaped grooves 54 allow the ridges 60 to radially surround the interior wall 46 in radially spaced relationship to one another. It should be appreciated that other shapes of the peaks 58 and grooves 54 may be used, as known to those skilled in the art.

Referring to FIGS. 2B and 2C, the membrane 44 includes a thickness that is defined between the interior wall 46 and the exterior wall 50 that is non-uniform. More specifically, each of the undulations 52 has a maximum thickness $t_{max}$ that is defined between the interior and the exterior wall 46, 50, at the peaks 58. Likewise, a minimum thickness $t_{min}$ is defined between the interior wall 46 and the exterior wall 50, at the grooves 54.

Referring to FIGS. 2A-2C and 3, the membrane 44 is formed from the micro-porous element and is configured such that the membrane 44 is vapor permeable and fluid impermeable. This means that the membrane 44 allows vapor V to flow therethrough while preventing fluid F to flow therethrough, as illustrated in FIG. 3. The filter 36 includes a cap 64 that extends across a portion of the fluid chamber 48 in spaced relationship to the inlet side 38 and the outlet side 40 of the housing 34. The cap 64 is configured to direct the flow of vapor V or fluid F radially outward such that only the vapor V flows radially out through the membrane 44, into the vapor passage 42. Once the vapor V is in the vapor passage 42, the vapor V flows out of the vapor passage 42, through the outlet side 40, and into the recirculation line 26. The vapor V then travels through the recirculation line 26 and is captured within the vapor canister 18. It should be appreciated that the membrane 44 is also configured such that when vapor V or air to travels from the outlet side 40 of the housing 34 and into the vapor passage 42, the vapor V or air can flow through the membrane 44, into the fluid chamber 48, through the inlet side 38 of the housing 34, and into the recirculation line 26 or the vapor line 28.

The filter 36 may be secured to the housing 34 by weld, adhesive, heat sealing, insert molding, or other methods known to those skilled in the art. One skilled in the art would know the appropriate attachment required for a particular housing 34 and filter 36 arrangement.

Referring again to the embodiment shown in FIG. 3, the valve assembly 12 is operatively disposed at the vent 30 of the fill head 16. In this embodiment, the valve assembly 12 is disposed between the fill head 16 and the recirculation line 26 such that the vent 30 of the fill head 16 opens into the valve assembly 12. As fluid F is flowing into the fill head 16, the fluid F and vapor V may splash and enter the valve assembly 12 that is in fluid communication with the fill head 16. The valve assembly 12 is configured to prevent the fluid F from flowing into the recirculation line 26 while allowing the vapor V to flow through the membrane 44 into the recirculation line 26. Placement of the valve assembly 12 at the fill head 16 prevents fluid F from entering a significant portion of the recirculation line 26. In addition, to prevent fluid F from accumulating within the valve assembly 12, the valve assembly 12 is angled such that fluid F that enters the filter 36 drains back out and into the fill head 16.

While the best modes for carrying out the invention have been described in detail, those familiar with the art to which this invention relates will recognize various alternative designs and embodiments for practicing the invention within the scope of the appended claims.

The invention claimed is:

1. A fuel system configured for filling a fuel tank with a volume of fluid comprising:
   a fill head in fluid communication with the fuel tank, wherein the fill head is configured such that fluid flows from the fill head to the fuel tank;
   a vapor canister configured for absorbing vapor therein;
   a recirculation line configured to fluidly extend between the fuel tank and the fill head;
   a vapor line configured to fluidly extend between the fuel tank and the vapor canister;
   a valve assembly operatively disposed along one of the vapor line and the recirculation line such that the valve assembly is disposed external to the fuel tank;
   wherein the valve assembly includes a housing having an inlet side and an outlet side and defining a vapor passage therein;
   wherein the valve assembly includes a filter having a membrane that is formed from a micro-porous element;
   wherein the filter is operatively disposed in the vapor passage and attached to the inlet side of the housing;
   wherein the membrane includes an interior wall surrounding a fluid chamber;
   wherein the filter is configured such that fluid and vapor enter the fluid chamber of the membrane from the inlet side and only vapor flows through the membrane into the vapor passage and exits the valve assembly through the outlet side;
   wherein the fill head defines a vent configured to open to the recirculation line; and
   wherein the valve assembly is configured to extend along the recirculation line between the vent and the vapor canister to prevent fluid from entering the vapor canister while allowing vapor to flow into the vapor canister.

2. A fuel system, as set forth in claim 1, wherein the filter has a generally cylindrically shaped profile.

3. A fuel system, as set forth in claim 1, wherein the micro-porous element is fluid impermeable and vapor permeable such that fluid is prevented from flowing therethrough and into the vapor canister while allowing vapor to flow therethrough and into the vapor canister.

4. A fuel system, as set forth in claim 1, wherein the filter includes a thickness defined between the interior wall and the exterior wall that is uniform.

5. A fuel system, as set forth in claim 1, wherein the filter includes a thickness defined between the interior wall and the exterior wall that is non-uniform.

6. A fuel system, as set forth in claim 1, wherein the exterior wall has a plurality of undulations that each extend to a peak and a groove defined between each of the undulations.

7. A fuel system, as set forth in claim 6, wherein each of the undulations has a maximum thickness that is defined between the interior wall and the exterior wall at each peak and a minimum thickness that is defined between the interior wall and the exterior wall at each groove.

8. A fuel system, as set forth in claim 7, wherein the undulations include a plurality of discs that radially surround the interior wall in spaced relationship to one another.

9. A fuel system, as set forth in claim 7, wherein the undulations include a plurality of ridges extending linearly along the exterior wall in radially spaced relationship to one another.

10. A fuel system, as set forth in claim 1, wherein the filter includes a cap extending across the fluid chamber in spaced relationship to the inlet side of the filter;
    wherein the cap is configured to prevent the flow of vapor or fluid therethrough and deflect the vapor such that the vapor only flows radially through the membrane to the outlet side.

11. A fuel system comprising:
    a fuel tank configured for receiving a volume of fluid;
    a fill head in fluid communication with the fuel tank, wherein the fill head is configured such that fluid flows from the fill head to the fuel tank;
    a vapor canister configured for absorbing vapor therein;
    a recirculation line fluidly extending between the fuel tank and the fill head;
    a vapor line fluidly extending between the fuel tank and the vapor canister;
    a valve assembly operatively disposed along one of the vapor line and the recirculation line such that the valve assembly is disposed external to the fuel tank, the valve assembly including;
    a housing having an inlet side and an outlet side and defining a vapor passage therein;
    a filter operatively disposed within the vapor passage and attached to the inlet side of the housing;
    wherein the filter includes a membrane having an interior wall surrounding a fluid chamber and an exterior wall opposing the fluid chamber;
    wherein the filter is operatively attached to the inlet side such that fluid and vapor are allowed to enter the fluid chamber from the inlet side and only vapor flows through the membrane into the vapor passage and exits the valve assembly through the outlet side;
    wherein the membrane is formed from a micro-porous element; wherein the interior wall is generally cylindrical;
    wherein the exterior wall includes a plurality of undulations that each extend to a peak and a groove defined between each of the undulations;
    wherein the fill head defines a vent in fluid communication with the recirculation line; and
    wherein the valve assembly fluidly extends along the recirculation line between the vent and the vapor canister to prevent fluid from entering the vapor canister while allowing vapor to flow into the vapor canister.

12. A fuel system, as set forth in claim 11, wherein the filter includes a thickness defined between the interior wall and the exterior wall that is uniform.

13. A fuel system, as set forth in claim 11, wherein the filter includes a thickness defined between the interior wall and the exterior wall that is non-uniform.

14. A fuel system, as set forth in claim 11, wherein each of the undulations has a maximum thickness that is defined between the interior wall and the exterior wall at each peak and a minimum thickness that is defined between the interior wall and the exterior wall at each groove.

15. A fuel system, as set forth in claim 11, wherein the undulations include a plurality of discs that extend in linearly spaced relationship to one another.

16. A fuel system, as set forth in claim 11, wherein the undulations include a plurality ridges that extend in radially spaced relationship to one another.

17. A fuel system, as set forth in claim 11, wherein the micro-porous element is configured to allow the passage of vapor and prevent the passage of liquid from the fluid chamber therethrough to the vapor passage.

18. A fuel system, as set forth in claim 11, wherein the filter includes a cap extending across the fluid chamber in spaced relationship to the inlet side of the filter; and wherein the cap is configured to prevent the flow of vapor or fluid therethrough and deflect the vapor such that the vapor only flows radially through the membrane to the outlet side.

19. A fuel system comprising:
a fuel tank configured for receiving a volume of fluid;
a fill head in fluid communication with the fuel tank, wherein the fill head is configured such that fluid flows from the fill head to the fuel tank;
wherein the fill head defines a vent;
a vapor canister configured for absorbing vapor therein;
a recirculation line fluidly extending between the fuel tank and the vent of the fill head;
a vapor line fluidly extending between the fuel tank and the vapor canister;
a valve assembly disposed along the recirculation line, external to the fuel tank, wherein the valve assembly includes:
a housing having an inlet side and an outlet side and defining a vapor passage therein;
a filter having a membrane that is formed from a micro-porous element;
wherein the filter is operatively disposed in the vapor passage and attached to the inlet side of the housing;
wherein the membrane includes an interior wall surrounding a fluid chamber and an exterior wall opposing the fluid chamber; and wherein the valve assembly is operatively disposed along the recirculation line such that the vent opens to the inlet side and the outlet side opens to the recirculation line; and
wherein the filter is configured such that fluid and vapor enter the fluid chamber of the membrane from the inlet side and only vapor flows through the membrane into the vapor passage and exits the valve assembly to the recirculation line through the outlet side.

20. A fuel system, as set forth in claim 19, wherein the filter includes a thickness defined between the interior wall and the exterior wall that is uniform.

21. A fuel system, as set forth in claim 19, wherein the filter includes a thickness defined between the interior wall and the exterior wall that is non-uniform.

22. A fuel system, as set forth in claim 19, wherein the exterior wall has a plurality of undulations that each extend to a peak and a groove defined between each of the undulations.

23. A fuel system, as set forth in claim 22, wherein each of the undulations has a maximum thickness that is defined between the interior wall and the exterior wall at each peak and a minimum thickness that is defined between the interior wall and the exterior wall at each groove.

24. A fuel system, as set forth in claim 22, wherein the undulations include a plurality of discs that extend in linearly spaced relationship to one another.

25. A fuel system, as set forth in claim 22, wherein the undulations include a plurality ridges that extend in radially spaced relationship to one another.

26. A fuel system, as set forth in claim 19, wherein the micro-porous element is configured to allow the passage of vapor and prevent the passage of liquid from the fluid chamber therethrough to the vapor passage.

27. A fuel system, as set forth in claim 19, wherein the filter includes a cap extending across the fluid chamber in spaced relationship to the inlet side of the filter; and wherein the cap is configured to prevent the flow of vapor or fluid therethrough and deflect the vapor such that the vapor only flows radially through the membrane to the outlet side.

28. A fuel system, as set forth in claim 19, wherein the fill head defines a vent in fluid communication with the recirculation line; and wherein the valve assembly fluidly extends along the recirculation line between the vent and the vapor canister to prevent fluid from entering the vapor canister while allowing vapor to flow into the vapor canister.

* * * * *